(12) United States Patent
Sakano et al.

(10) Patent No.: US 10,544,865 B2
(45) Date of Patent: Jan. 28, 2020

(54) SEALING DEVICE

(71) Applicant: NOK CORPORATION, Tokyo (JP)

(72) Inventors: Yuya Sakano, Fukushima (JP);
Yoshihisa Yamaguchi, Fukushima (JP);
Hideharu Hyakutake, Fukushima (JP);
Masaaki Yagi, Fukushima (JP);
Yoshimi Imamoto, Fukushima (JP)

(73) Assignee: NOK CORPORATION (JP)

( * ) Notice: Subject to any disclaimer, the term of this patent is extended or adjusted under 35 U.S.C. 154(b) by 67 days.

(21) Appl. No.: 15/559,992

(22) PCT Filed: Mar. 25, 2016

(86) PCT No.: PCT/JP2016/059546
§ 371 (c)(1),
(2) Date: Sep. 20, 2017

(87) PCT Pub. No.: WO2016/158718
PCT Pub. Date: Oct. 6, 2016

(65) Prior Publication Data
US 2018/0066757 A1  Mar. 8, 2018

(30) Foreign Application Priority Data
Apr. 2, 2015 (JP) .................... 2015-075999

(51) Int. Cl.
*F16J 15/3204* (2016.01)
(52) U.S. Cl.
CPC ................. *F16J 15/3204* (2013.01)
(58) Field of Classification Search
CPC ...... F16J 15/324; F16J 15/164; F16J 15/3244; F16J 15/3264; F16J 15/3256
See application file for complete search history.

(56) References Cited

U.S. PATENT DOCUMENTS

| 4,573,690 A * | 3/1986 | DeHart | F16J 15/324 277/309 |
| 8,585,296 B2 * | 11/2013 | Yamaguchi | F16C 33/7853 277/347 |

(Continued)

FOREIGN PATENT DOCUMENTS

| JP | JP-H02-113173 A | 4/1990 |
| JP | H03-057563 U | 6/1991 |

(Continued)

OTHER PUBLICATIONS

Extended European Search Report for Application No. EP 16 77 2599 dated Feb. 15, 2018 (5 pages).

*Primary Examiner* — Eugene G Byrd
(74) *Attorney, Agent, or Firm* — Harness, Dickey & Pierce, P.L.C.

(57) ABSTRACT

In a sealing device having a combination of a seal lip and a seal flange which slidably come into contact with each other, and having a thread groove in an axial end face of the seal flange, the seal lip installed to a not-rotating housing side slidably comes into contact with an axial end face of the seal flange in a rotating shaft side, and the thread groove achieves a fluid pumping action at the rotating time in an axial end face of the seal flange. The thread groove has an inner peripheral side inclined surface as a part of an inner surface thereof, and an angle formed between an inner peripheral surface of a leading end portion of the seal lip and the inner peripheral side inclined surface is set to a range of 0 degree±3 degrees. The sealing device can suppress generation of a static leakage.

2 Claims, 9 Drawing Sheets

(56) References Cited

U.S. PATENT DOCUMENTS

| | | | |
|---|---|---|---|
| 2007/0187901 A1* | 8/2007 | Matsui | F16J 15/326 |
| | | | 277/551 |
| 2007/0201782 A1 | 8/2007 | Miyagawa et al. | |
| 2010/0052262 A1* | 3/2010 | Ishida | F16C 41/007 |
| | | | 277/349 |
| 2010/0066030 A1* | 3/2010 | Kobayashi | F16J 15/324 |
| | | | 277/402 |
| 2013/0175763 A1* | 7/2013 | Berdichevsky | F16J 15/324 |
| | | | 277/552 |
| 2014/0175756 A1* | 6/2014 | Ikeda | F16J 15/164 |
| | | | 277/552 |
| 2015/0276059 A1 | 10/2015 | Nakagawa | |
| 2015/0285380 A1 | 10/2015 | Nakagawa | |
| 2017/0114901 A1* | 4/2017 | Yamanaka | F16J 15/32 |
| 2018/0023707 A1* | 1/2018 | Yamaguchi | F16J 15/3204 |
| | | | 277/400 |
| 2018/0259072 A1* | 9/2018 | Komyo | F16J 15/3244 |

FOREIGN PATENT DOCUMENTS

| | | |
|---|---|---|
| JP | 2009-191913 A | 8/2009 |
| JP | 2014-129837 A | 7/2014 |
| JP | 2014-137129 A | 7/2014 |
| WO | WO-2014-065013 A1 | 5/2014 |
| WO | WO-2014-065014 A1 | 5/2014 |

* cited by examiner

FIG. 4A    FIG. 4B
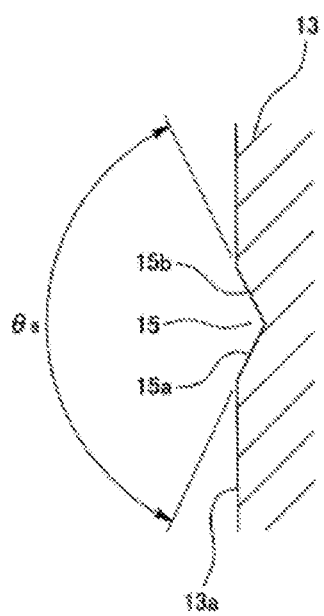 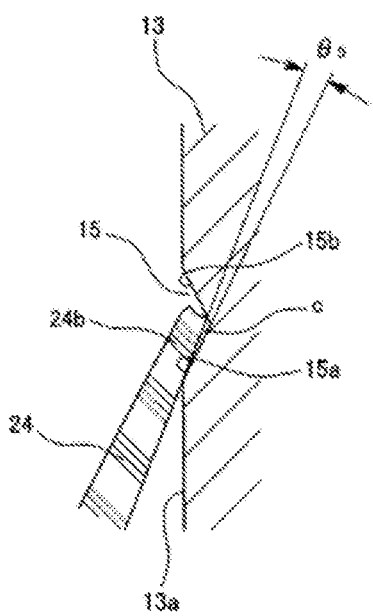

FIG. 5A
FIG. 5B
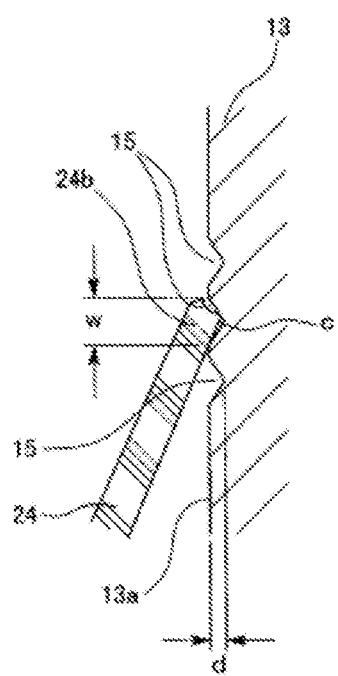
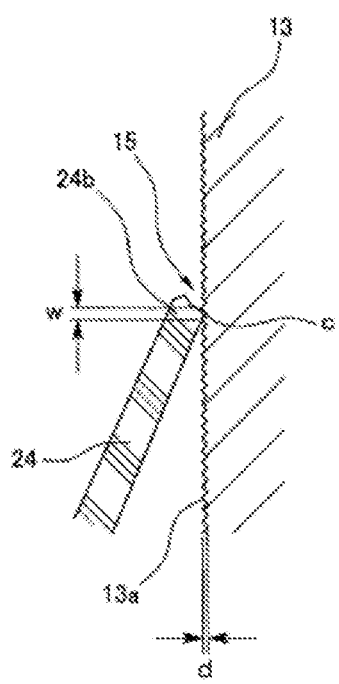

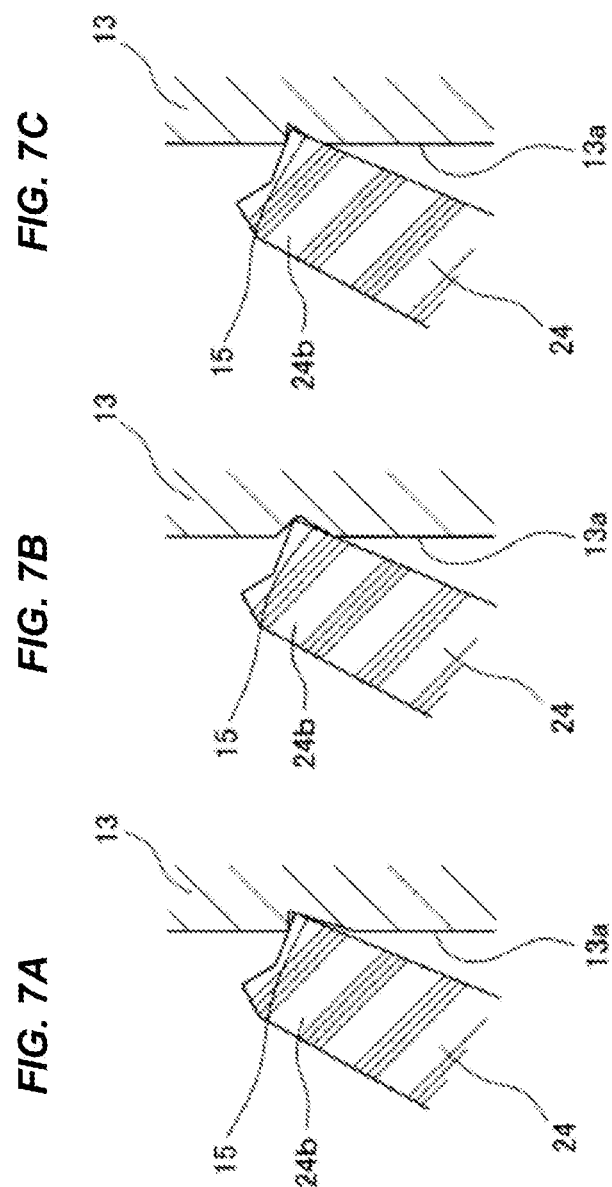

SEALING DEVICE

CROSS-REFERENCE TO RELATED APPLICATIONS

This application is a U.S. National Stage Application of International Application No. PCT/JP2016/059546, filed on Mar. 25, 2016, and published in Japanese as WO 2016/158718 A1 on Oct. 6, 2016 and claims priority to Japanese Application No. 2015-075999, filed on Apr. 2, 2015. The entire disclosures of the above applications are incorporated herein by reference.

BACKGROUND OF THE INVENTION

Field of the Invention

The present invention relates to a sealing device according to a sealing technique. The sealing device according to the present invention is used as an oil seal for rotation, for example, in a field associated to the motor vehicle or a field of a general purpose machine.

Description of the Conventional Art

Conventionally, there has been known a sealing device 101 having a structure in which a seal lip 102 installed to a not-rotating housing 51 side slidably comes into contact with an axial end face 103a of a seal flange 103 in a rotating shaft 61 side, as shown in FIG. 8A. The axial end face 103a of the seal flange 103 is provided with a thread groove 104 which achieves a fluid pumping action caused by a centrifugal force when the rotating shaft 61 rotates, as shown in FIG. 8B, and the seal lip 102 slidably comes into contact with the axial end face 103a provided with the thread groove 104.

In the sealing device 101, the seal flange 103 rotating together with the rotating shaft 61 achieves a fluid shake-off action caused by the centrifugal force, and the thread groove 104 achieves the fluid pumping action caused by the centrifugal force, when the rotating shaft 61 rotates. As a result, it is possible to inhibit the sealed fluid in a machine inner side A from leaking out to a machine outer side B after passing a contact portion between the seal lip 102 and the seal flange 103.

However, in the conventional sealing device 101 mentioned above, a further functional improvement is required in the following point.

More specifically, in the sealing device 101, the seal flange 103 rotating together with the rotating shaft 61 achieves the fluid shake-off action caused by the centrifugal force and the thread groove 104 achieves the fluid pumping action caused by the centrifugal force as mentioned above, when the rotating shaft 61 rotates. As a result, it is possible to inhibit the sealed fluid in the machine inner side A from leaking out to the machine outer side B. However, in the case that the rotation of the rotating shaft 61 stops, the centrifugal force disappears and both the actions disappear. Therefore, the sealed fluid may pass through the contact portion through the thread groove 104 and leak out to the machine outer side B (possibility of generation of so-called static leakage).

In the sealing device 101 mentioned above, a cross sectional shape of the thread groove 104 is formed into an isosceles triangle having a groove opening portion as a base, and the thread groove 104 is provided with an inner peripheral side inclined surface 104a and an outer peripheral side inclined surface 104b as an inner surface thereof, as shown in FIG. 9A in an enlarged manner. Further, as shown in FIG. 9B, in the case that the seal lip 102 is combined with the thread groove 104 and the leading end portion 102a of the seal lip 102 enters into the thread groove 104, a comparatively large angle $\theta_2$ is formed between the inner peripheral surface of the leading end portion 102a of the seal lip 102 and the inner peripheral side inclined surface 104a in an entering state, and a clearance c having a comparatively large cross sectional area is accordingly formed between the inner peripheral surface of the leading end portion 102a of the seal lip 102 and the inner surface of the thread groove 104. As a result, the static leakage is generated by setting the comparatively large clearance c as the leakage flow path. A groove opening angle $\theta_1$ of the thread groove 104 having the isosceles triangle in the cross section is often in the vicinity of 113 degrees and the angle $\theta_2$ between the inner peripheral surface of the leading end portion 102a of the seal lip 102 and the inner peripheral side inclined surface 104a is often equal to or more than 10 degrees.

The present invention is made by taking the above points into consideration, and an object of the present invention is to provide a sealing device having a combination of a seal lip and a seal flange which slidably come into contact with each other, and provided with a thread groove in an axial end face of the seal flange, wherein the sealing device can suppress generation of a static leakage.

SUMMARY OF THE INVENTION

The present invention employs the following means for achieving the above object.

More specifically, a first invention (hereinafter, refer also to as the first invention of the present application) is a sealing device having a structure in which a seal lip installed to a not-rotating housing side slidably comes into contact with an axial end face of a seal flange in a rotating shaft side, and provided with a thread groove which achieves a fluid pumping action at the rotating time in an axial end face of the seal flange, wherein the thread groove is provided with an inner peripheral side inclined surface as a part of an inner surface thereof, and an angle formed between an inner peripheral surface of a leading end portion of the seal lip and the inner peripheral side inclined surface is set to a range of 0 degree±3 degrees.

In the sealing device having the structure mentioned above, the angle formed by the inner peripheral surface of the leading end portion in the seal lip and the inner peripheral side inclined surface of the thread groove is set to the range of 0 degree and ±3 degrees in the state in which the leading end portion of the seal lip enters into the thread groove which achieves the fluid pumping action. As a result, any clearance is not formed between the inner peripheral surface of the leading end portion in the seal lip and the inner surface of the thread groove, or the magnitude of the clearance (the cross sectional area of the opening) is reduced in comparison with the conventional art in FIGS. 8A and 8b, and FIGS. 9A and 9B in conjunction with the reduction of the angle even in the case that the clearance is formed. Therefore, the leakage flow path disappears, or the magnitude of the leakage flow path is reduced. Accordingly, the sealed fluid is hard to flow, and the static leakage is suppressed.

The thread groove is not particularly limited its cross sectional shape, as long as the thread groove is provided with the inner peripheral side inclined surface as a part of the inner surface thereof. For example, the cross sectional shape may be formed into a scalene triangle or an isosceles triangle in which a groove opening portion is set to a base.

The second invention (hereinafter, refer also to as the second invention of the present application) is a sealing device having a structure in which a seal lip installed to a not-rotating housing side slidably comes into contact with an axial end face of a seal flange in a rotating shaft side, and provided with a thread groove which achieves a fluid pumping action at the rotating time in an axial end face of the seal flange, wherein the thread groove is constructed by a plurality of thread grooves, or is constructed by a lot of thread grooves which are formed with a magnitude of a process grid level.

In the sealing device having the structure mentioned above, a plurality of thread grooves are provided, or a lot of thread grooves formed with the magnitude of the process grid level are provided. A cross sectional area per one thread groove is set to be small in comparison with the conventional art in FIGS. 8A and 8B to FIGS. 9A and 9B mentioned above. Therefore, even in the case that any clearance is formed between the inner peripheral surface of the leading end portion in the seal lip and the inner surface of the thread groove, the magnitude of the clearance (the cross sectional area of the opening) is reduced, and the magnitude of the leakage flow path is reduced. As a result, the sealed fluid is hard to flow, and the static leakage is suppressed.

The third invention (hereinafter, refer also to as the third invention of the present application) is a sealing device having a structure in which a seal lip installed to a not-rotating housing side slidably comes into contact with an axial end face of a seal flange in a rotating shaft side, and provided with a thread groove which achieves a fluid pumping action at the rotating time in an axial end face of the seal flange, wherein the following relationship is established:

$$\theta in \leq \phi in \text{ and } \theta out \leq \phi out \qquad (1)$$

in which θin is an inner peripheral side angle of the thread groove and θout is an outer peripheral side angle, as well as φin is an inner peripheral side contact angle of the seal lip, and θout is an outer peripheral side contact angle thereof, when a leading end of the seal lip is positioned in a groove bottom portion of the thread groove.

In the sealing device having the structure mentioned above, since the relationship of the above expression (1) is established, any clearance is not formed between the inner peripheral surface of the leading end portion in the seal lip and the inner peripheral side inclined surface of the thread groove. Therefore, since the leakage flow path disappears, the sealed fluid is hard to flow, and the static leakage is suppressed.

Effect of the Invention

In the present invention, in the sealing device having the combination of the seal lip and the seal flange which slidably come into contact with each other, and provided with the thread groove in the axial end face of the seal flange, it is possible to inhibit the static leakage from being generated, and it is possible to inhibit the sealed fluid from leaking out even when the rotating shaft stands still as well as the rotating shaft rotates.

BRIEF EXPLANATION OF THE DRAWINGS

FIGS. 4A and 4B are explanatory views of a thread groove which is provided in a sealing device according to a second embodiment of the first invention of the present application, in which FIG. 4A is a cross sectional view of the thread groove, and FIG. 4B is a cross sectional view of a state in which the seal lip is combined with the thread groove;

FIG. 5A is a cross sectional view of a state in which the seal lip is combined with a thread groove which is provided in a sealing device according to a third embodiment of a second invention of the present application;

FIG. 5B is a cross sectional view of a state in which the seal lip is combined with a thread groove which is provided in a sealing device according to a fourth embodiment of the second invention of the present application;

FIGS. 7A, 7B and 7C are views showing sealing devices according to comparative examples, in which FIG. 7A is a cross sectional view of a state in which the seal lip is combined with a thread groove which is provided in the sealing device according to the first comparative example, FIG. 7B is a cross sectional view of a state in which the seal lip is combined with a thread groove which is provided in the sealing device according to the second comparative example, and FIG. 7C is a cross sectional view of a state in which the seal lip is combined with a thread groove which is provided in the sealing device according to the third comparative example;

FIGS. 8A and 8B are views showing a sealing device according to the conventional example, in which FIG. 8A is a cross sectional view of a substantial part of the sealing device according to the conventional example, and FIG. 8B is an explanatory view of a thread groove which is provided in the sealing device;

DETAILED DESCRIPTION OF PREFERRED EMBODIMENTS

Next, a description will be given of embodiments according to the present invention with reference to the accompanying drawings.

First Embodiment

The first embodiment is an embodiment according to the first invention of the present application.

Figure 1:
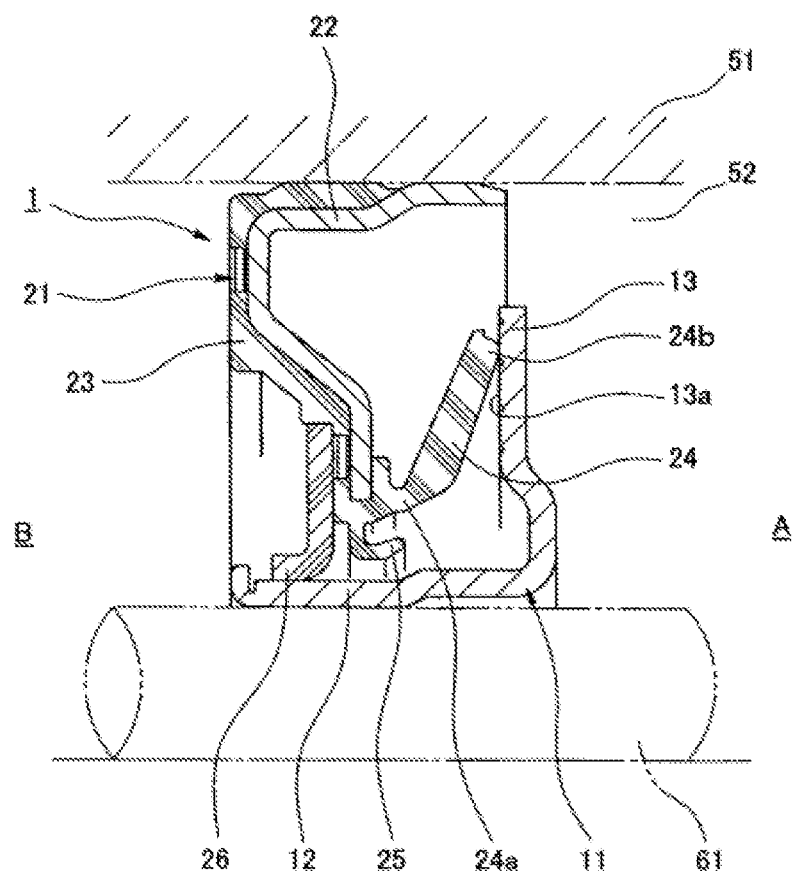
FIG. 1 is a cross sectional view of a substantial part of a sealing device according to a first embodiment of a first invention of the present application.

FIG. 1 shows a cross section of a substantial part of a sealing device 1 according to the embodiment of the present invention.

The sealing device 1 according to the embodiment is a sealing device having a structure in which a seal lip 24 installed to a not-rotating housing 51 side slidably comes into contact with an axial end face 13a of a seal flange 13 in a rotating shaft 61 side, and is a sealing device (an oil seal for an engine) sealing so as to prevent a sealed fluid (an oil) in a machine inner side (an oil side) A from leaking out to a machine outer side (an atmospheric air side) B between a housing (a seal housing) 51 and a rotating shaft 61 which is inserted into a shaft hole 52 provided in the housing 51. Further, the sealing device 1 is constructed by a combination of a lip seal member 21 which is installed to an inner periphery of the shaft hole 52 in the housing 51, and a slinger 11 which is installed to an outer periphery of the rotating shaft 61, the lip seal member 21 is provided with a seal lip 24 described in claim 1, and the slinger 11 is provided with a seal flange described in claim 1 as a flange portion 13.

Figure 2:
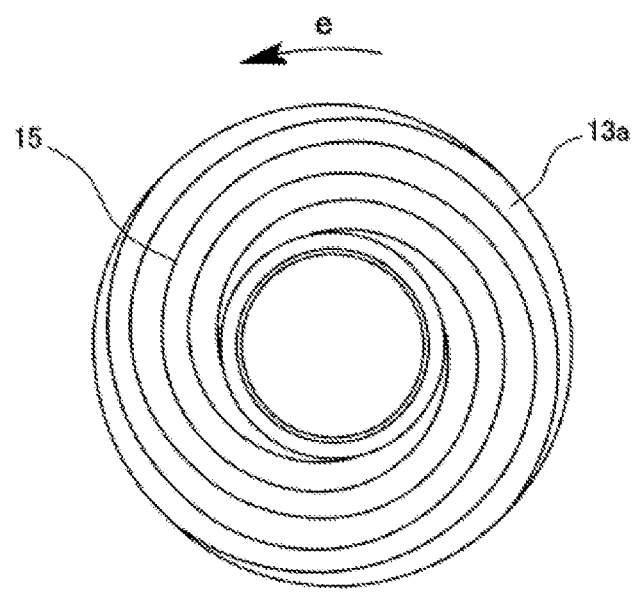
FIG. 2 is an explanatory view of a thread groove which is provided in the sealing device.

The slinger 11 is made of a rigid material such as metal, integrally has a sleeve portion 12 which is fixed (fitted) to an outer peripheral surface of the rotating shaft 61, and an outward flange portion 13 which is provided in one end portion (a machine inner side end portion) of the sleeve portion 12 in an axial direction, and is provided in a machine outer side end face 13a corresponding to the other end face of the flange portion 13 in the axial direction with a thread groove 15 which achieves an action of pushing back the sealed fluid toward an outer peripheral side (the machine inner side A) by achieving a fluid pumping action caused by centrifugal force when the rotating shaft 61 rotates, as shown in FIG. 2. An arrow e denotes a rotating direction of the rotating shaft 61.

Meanwhile, the lip seal member 21 has an attaching ring 22 which is fixed (fitted) to an inner peripheral surface of a shaft hole 52 in the housing 51 and is made of the rigid material such as the metal, and a rubber-like elastic body 23 which is attached (vulcanization bonded) to the attaching ring 22, and is integrally provided with a seal lip (an end face lip) 24 which is slidably brought into contact with the machine outer side end face 13a of the flange portion 13 in the slinger 11 by the rubber-like elastic body 23, and an oil recovery lip 25 which is not in contact with the slinger 11. Further, a dust lip 26 slidably coming into contact with the outer peripheral surface of the sleeve portion 12 in the slinger 11 is assembled in relation to the rubber-like elastic body 23. The oil recovery lip 25 is arranged in the machine outer side B of the seal lip 24, and the dust lip 26 is arranged further in the machine outer side B of the oil recovery lip 25.

The seal lip 24 is provided diagonally toward the machine inner side A and an outer side in a radial direction in such a manner as to be increased its diameter little by little from a base end portion 24a thereof to a leading end portion 24b, and is in contact with the machine outer side end face 13a of the flange portion 13 in an inner peripheral surface of the leading end portion 24b. Further, a predetermined interference (contact surface pressure) is set in relation to the contact. Therefore, the seal lip 24 is elastically in contact with the machine outer side end face 13a of the flange portion 13 with the predetermined interference in the inner peripheral surface of the leading end portion 24b thereof.

Figure 3A:
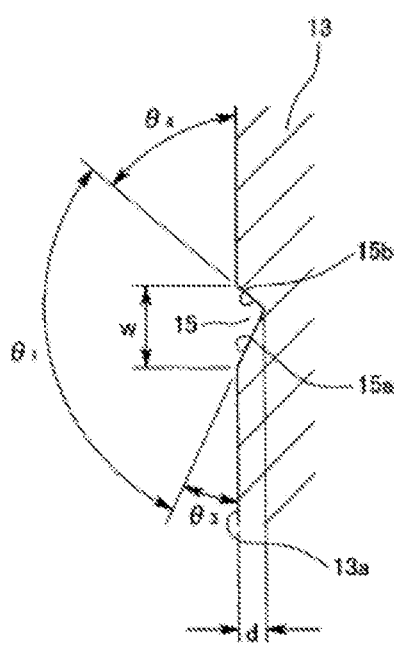
FIG. 3A is an enlarged cross sectional view of the thread groove.
Figure 3B:
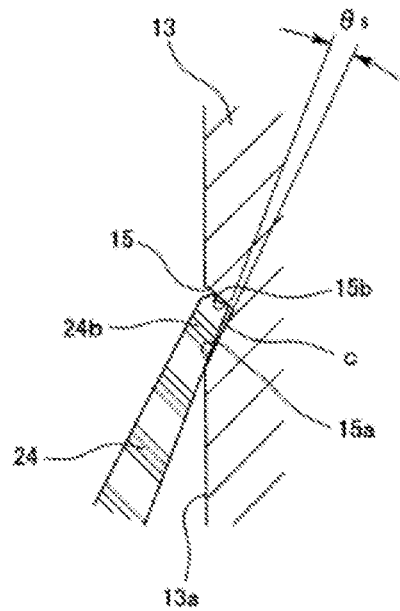
FIG. 3B is an enlarged cross sectional view of a state in which a seal lip is combined with the thread groove.
Figure 9A:
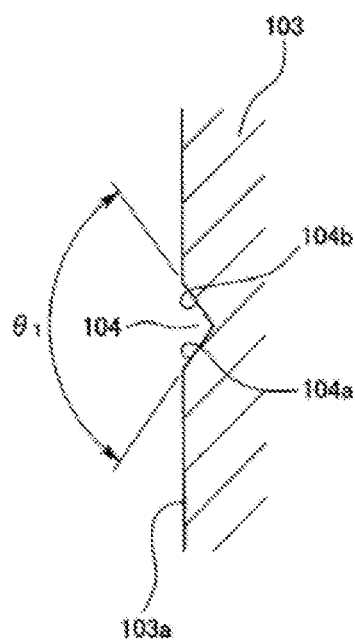
FIG. 9A is an enlarged cross sectional view of the thread groove.
Figure 9B:
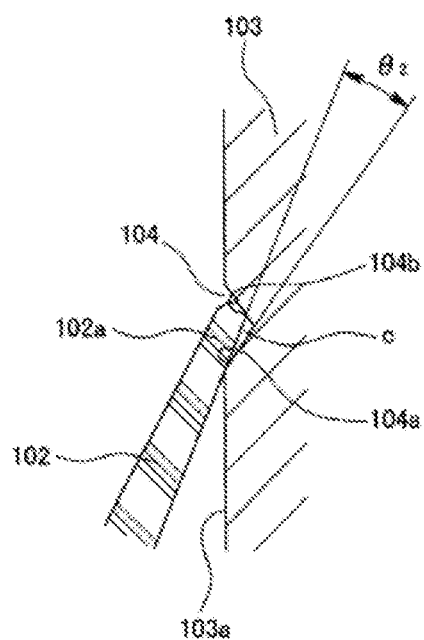
FIG. 9B is an enlarged cross sectional view of a state in which the seal lip is combined with the thread groove.

The thread groove 15 achieving the fluid pumping action is shown in detail in FIG. 3A. A cross sectional shape of the thread groove 15 in a longitudinally perpendicular direction is formed into a scalene triangle having a groove opening portion as a base. More specifically, the thread groove 15 is provided with an inner peripheral side inclined surface 15a which forms a long side of the scalene triangle and is formed into a linear cross section, and an outer peripheral side inclined surface 15b which forms a short side of the scalene triangle and is formed into the linear cross section in the same manner, and an angle of incline $\theta_3$ of the inner peripheral side inclined surface 15a in relation to the machine outer side end face 13a is set to be smaller than an angle of incline $\theta_4$ of the outer peripheral side inclined surface 15b in relation to the machine outer side end face 13a. As a result, an angle $\theta_5$ is set to a range of 0 degree±3 degrees, the angle $\theta_5$ being formed by an inner peripheral surface of the leading end portion 24b of the seal lip 24 and the inner peripheral side inclined surface 15a of the thread groove 15 in a state in which the leading end portion 24b of the seal lip 24 enters into the thread groove 15 as shown in FIG. 3B. Therefore, a magnitude (an opening cross sectional area) of a clearance c formed between the inner peripheral surface of the leading end 24b of the seal lip 24 and the inner surface of the thread groove 15 is set to be smaller in the thread groove 15 in FIGS. 3A and 3B than in the thread groove 104 in FIGS. 9A and 9B, under a condition that a groove width w is fixed (or a groove depth d is fixed) and the groove opening angle $\theta_1$ is fixed (for example, 113 degrees), in comparison with the thread groove 104 having the isosceles triangular cross section shown in FIGS. 9A and 9B.

In the sealing device 1 having the structure mentioned above, the seal lip 24 is in contact with the machine outer side end face 13a of the flange portion 13 in the leading end portion 24b thereof. When the rotating shaft 61 rotates in this state and the flange portion 13 rotates in a driven manner, the flange portion 13 rotating together with the rotating shaft 61 achieves the fluid shake-off action caused by the centrifugal force, and the thread groove 15 achieves the fluid pumping action caused by the centrifugal force. As a result, it is possible to inhibit the sealed fluid in the machine inner side A from passing through the contact portion between the seal lip 24 and the flange portion 13 and leaking out to the machine outer side B.

Further, when the rotating shaft 61 stands still, the sealed fluid is going to leak along the thread groove 15. However, since the angle $\theta_5$ is set to the range of 0 degree±3 degrees, the angle $\theta_5$ being formed by the inner peripheral surface of the leading end portion 24b of the seal lip 24 and the inner peripheral side inclined surface 15a of the thread groove 15 in the state in which the leading end portion 24b of the seal lip 24 enters into the thread groove 15 as mentioned above, and the magnitude of the clearance c formed between the inner peripheral surface of the leading end portion 24b of the seal lip 24 and the inner surface of the thread groove 15 is set to be small, the cross sectional area of the leakage flow path is set to be small, and the sealed fluid is accordingly hard to leak. Further, since the micro clearance c (FIG. 3B) is formed between the inner surface of the thread groove 15 and the seal lip 24 in the embodiment, there is fear that the sealed fluid leaks therethrough, however, since the sealed fluid (the oil) is stuck fast to the periphery of the clearance c on the basis of a surface tension in the micro clearance c, the sealed fluid hardly flows within the thread groove 15. Therefore, it is possible to almost completely prevent the static leakage.

Therefore, according to the above description, it is possible to inhibit the static leakage from being generated while maintaining a sealing performance at the rotating time.

Second Embodiment

A second embodiment is an embodiment according to the first invention of the present application.

In the first embodiment mentioned above, the cross sectional shape of the thread groove 15 is formed into the scalene triangle so that the angle $\theta_5$ formed by the inner peripheral surface of the leading end portion 24b of the seal lip 24 and the inner peripheral side inclined surface 15a of the thread groove 15 is set to the range of 0 degree±3 degrees, in the state in which the groove opening angle $\theta_1$ of the thread groove 15 is maintained in the vicinity of 113 degrees in the same manner as the conventional structure. However, if the groove opening angle $\theta_1$ of the thread groove 15 is expanded from the vicinity of 113 degrees which is the same as the conventional angle, the angle $\theta_5$ formed by the inner peripheral surface of the leading end portion 24b of the seal lip 24 and the inner peripheral side inclined surface 15a of the thread groove 15 can be set to the range of 0 degree±3 degrees in the state in which the cross sectional shape of the thread groove 15 is set to the isosceles triangle.

As such an example as the above, in FIGS. 4A and 4B which are shown as the second embodiment, a groove opening angle $\theta_6$ of the thread groove 15 is set to a greater angle than the conventional one, for example, 130 degrees as well as the cross sectional shape of the thread groove 15 is set to the isosceles triangle. As a result, the angle $\theta_5$ formed by the inner peripheral surface of the leading end portion 24b of the seal lip 24 and the inner peripheral side inclined surface 15a of the thread groove 15 is set to the range of 0 degree±3 degrees.

Therefore, even in the example in FIGS. 4A and 4B, since the magnitude of the clearance c formed between the inner peripheral surface of the leading end portion 24b of the seal lip 24 and the inner surface of the thread groove 15 is set to be small, the cross sectional area of the leakage flow path becomes small, and the sealed fluid is accordingly hard to leak.

Further, since a micro clearance c (FIG. 4B) is formed between the inner surface of the thread groove 15 and the seal lip 24 in this example, there is fear that the sealed fluid leaks therethrough. However, since the sealed fluid (the oil) is stuck fast to the periphery of the clearance c due to the surface tension in the micro clearance c, the sealed fluid hardly flows within the thread groove 15. Therefore, it is possible to approximately completely prevent the static leakage.

Therefore, according to the description mentioned above, it is possible to inhibit the static leakage from being generated while maintaining the sealing performance at the rotating time.

In order to increase the action that the sealed fluid (the oil) is stuck fast to the periphery of the clearance c due to the surface tension thereof, it is thought that a surface area is enlarged by the provision of a satin finished portion on an inner surface of the thread groove 15 and a surface of the seal lip 24 which construct the periphery of the clearance c according to a shot blasting method.

Third Embodiment

A third embodiment is an embodiment according to the second invention of the present application.

In order to set the magnitude of the clearance c formed between the inner peripheral surface of the leading end portion 24b of the seal lip 24 and the inner surface of the thread groove 15 to be small, it is thought to make a cross sectional area of each of the thread grooves 15 small as well as increasing the number of the thread groove 15 in addition to the first and second embodiments mentioned above. Even in the case that the cross sectional area of each of the thread grooves 15 is made small as well as the number of the thread grooves 15 is increased as mentioned above, the surface tension of the sealed fluid tends to be generated, and the sealed fluid is hard to flow within the thread groove 15. As a result, it is possible to inhibit the static leakage from being generated.

In an example in FIG. 5A which is shown as the third embodiment, the number of the thread groove 15 is increased to three from one in the first and second embodiment, and a groove depth d, a groove width w and a cross sectional area of each of the thread grooves 15 are alternatively set to be small. Since the leading end portion 24b of the seal lip 24 enters into any one thread groove 15 among three thread grooves 15 so as to form the clearance c, the cross sectional area of the clearance c becomes small.

Fourth Embodiment

A fourth embodiment is an embodiment according to the second invention of the present application.

In an example in FIG. 5B which is shown as the fourth embodiment, the thread groove 15 is formed in a process grid level and the number of the thread grooves 15 is accordingly increased to plural number from one. Alternatively, the groove depth d, the groove width w and the cross sectional area of each of the thread grooves 15 are set to be small. Since the leading end portion 24b of the seal lip 24 enters into any one thread groove 15 among a lot of thread grooves 15 so as to form the clearance c, the cross sectional area of the clearance c becomes small.

Therefore, even in these examples, the sealed fluid is hard to flow within the thread groove 15. As a result, it is possible to inhibit the static leakage from being generated.

Further, the angle formed by the inner peripheral surface of the leading end portion 24b of the seal lip 24 and the inner peripheral side inclined surface 15a of the thread groove 15 may be set to the range of 0 degree±3 degrees in a state in which the cross sectional area of each of the thread grooves 15 is made small as well as the number of the thread grooves 15 is increased.

Fifth Embodiment

A fifth embodiment is an embodiment according to a third invention of the present application.

In order to suppress the static leakage, it is effective to set the angle of the thread groove 15 as follows.

More specifically, the angle of the thread groove 15 is set so as to satisfy the following relationship:

$$\theta in \leq \phi in \text{ and } \theta out \leq \phi out \qquad (1)$$

in which $\phi in$ is an inner peripheral side angle (an angle formed with respect to the slinger end face) of the thread groove and $\phi out$ is an outer peripheral side angle, as well as $\theta in$ is an inner peripheral side contact angle (an angle formed with respect to the slinger end face) of the seal lip, and $\theta out$ is an outer peripheral side contact angle thereof, when a leading end of the seal lip is positioned in a groove bottom portion of the thread groove.

According to this structure, it is possible to prevent the static leakage while maintaining the same pumping amount as the conventional one by the thread groove portion of the slinger. As a result, it is possible to secure a stable sealing performance over the long term.

Figure 6:
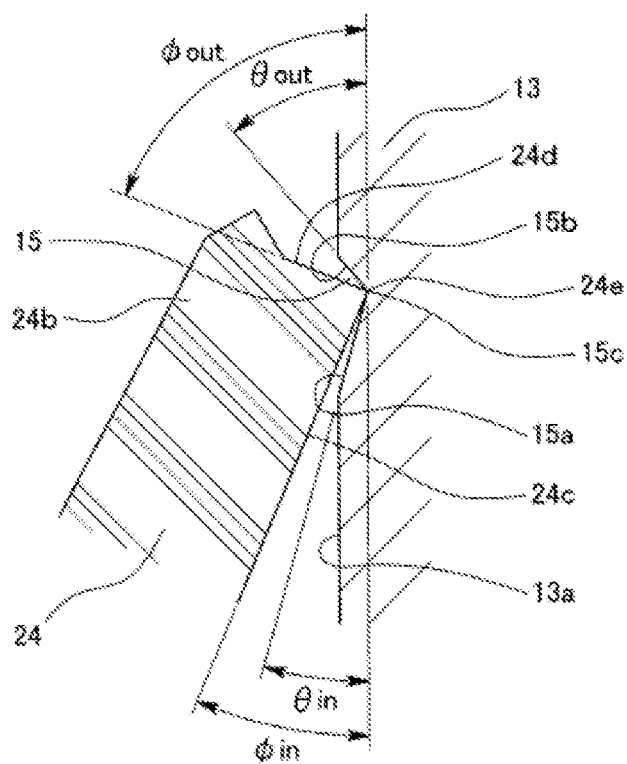
FIG. 6 is a cross sectional view of a state in which the seal lip is combined with a thread groove which is provided in a sealing device according to a fifth embodiment of a third invention of the present application.
Figure 8A:
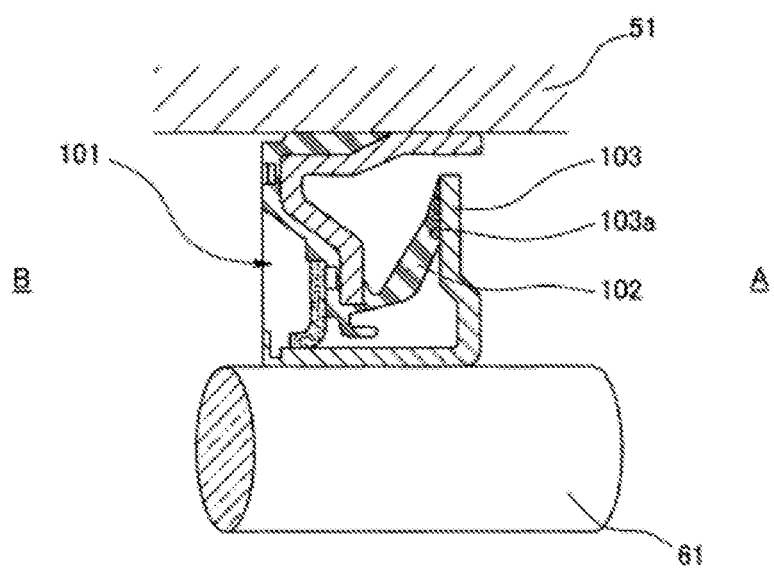
Figure 8B:
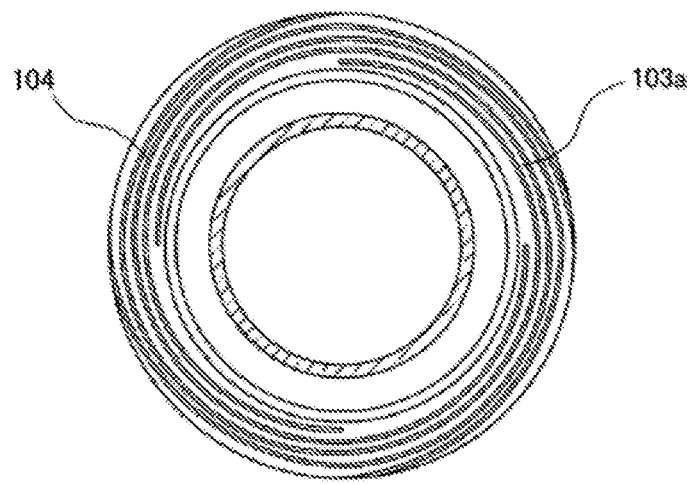

In an example in FIG. 6 which is shown as the fifth embodiment corresponding to the example, the angle of the thread groove 15 is set so as to satisfy the following relationship:

$$\theta in \leq \phi in \text{ and } \theta out \leq \phi out \qquad (1)$$

in which φin is an inner peripheral side angle (an angle formed with respect to the slinger end face 13a) of the thread groove 15 and φout is an outer peripheral side angle, as well as θin is an inner peripheral side contact angle (an angle formed with respect to the slinger end face 13a) of the seal lip 24, and θout is an outer peripheral side contact angle thereof, when an inner peripheral side corner portion 24e of a leading end portion 24b of the seal lip 24 (a position where the inner peripheral surface 24c of the seal lip 24 and the leading end face (the thickness surface) 24d intersect) exists at a position of the groove bottom portion 15c of the thread groove 15 having the triangular cross sectional shape (a position where the inner peripheral side inclined surface 15a of the thread groove 15 and the outer peripheral side inclined surface 15b intersect).

Comparison with comparative examples which do not satisfy the relationship of the expression (1) is as follows.

In all of the fifth embodiment shown in FIG. 6, the first comparative example shown in FIG. 7A, the second comparative example shown in FIG. 7B and the third comparative example shown in FIG. 7C, φin is about 20 degrees, and φout is about 70 degrees. θin and θout are set as shown in the following Table 1.

TABLE 1

|  | Fifth embodiment | First comparative example | Second comparative example | Third comparative example |
|---|---|---|---|---|
| θin | 15° | 15° | 30° | 30° |
| θout | 40° | 80° | 40° | 80° |

In the fifth embodiment shown in FIG. 6, the leading end portion 24b of the seal lip 24 continuously comes into contact with the inner peripheral side inclined surface 15a and the outer peripheral side inclined surface 15b of the thread groove 15 from the inner peripheral side toward the outer peripheral side without pause circumferentially in such a manner as to go over the inner peripheral side inclined surface 15a and the outer peripheral side inclined surface 15b. As a result, the sealed fluid (the oil) has not chance of going around the inner peripheral side of the seal lip 24.

On the contrary, the first comparative example shown in FIG. 7A corresponds to the case that θout≤φout is not established. In this groove shape, since the leading end portion 24b of the seal lip 24 does not come into contact with the outer peripheral side inclined surface 15b of the thread groove 15, the clearance is generated.

The second comparative example shown in FIG. 7B corresponds to the case that θin≤φin is not established. In this groove shape, since the leading end portion 24b of the seal lip 24 does not come into contact with the inner peripheral side inclined surface 15a of the thread groove 15, the clearance is generated.

The third comparative example shown in FIG. 7C corresponds to the case that θout≤φout is not established and θin≤φin is not established. In this groove shape, since the leading end portion 24b of the seal lip 24 does not come into contact with both of the inner peripheral side inclined surface 15a and the outer peripheral side inclined surface 15b of the thread groove 15, the clearance is generated.

Therefore, the static leakage can be sufficiently suppressed only in the case that the expression (1) mentioned above is established.

Further, in the fifth embodiment, the angle formed by the inner peripheral surface 24c of the leading end portion 24b of the seal lip 24 and the inner peripheral side inclined surface 15a of the thread groove 15 may be set to the range of 0 degree±3 degrees in the state in which the expression (1) mentioned above is established.

What is claimed is:

1. A sealing device comprising:
   a seal lip fit to a non-rotating housing; and
   a seal flange fit to and extending radially outward from a rotating shaft, the seal flange including an axial end face having a thread groove formed therein, the thread groove being configured to exhibit a fluid pumping action upon rotation of the seal flange with the rotating shaft,
   wherein the seal lip contacts the axial end face having the thread groove;
   the thread groove is defined by an inner peripheral side inclined surface and an outer peripheral side inclined surface that intersects with the inner peripheral side inclined surface; and
   the seal lip includes a leading end defined by an outer peripheral side surface that faces the non-rotating housing, and an opposite inner peripheral surface that faces the rotating shaft and contacts the inner peripheral inclined surface of the thread groove, and an angle formed between the inner peripheral surface of the leading end and the inner peripheral side inclined surface of the thread groove is within a range of −3 degrees to +3 degrees.

2. The sealing device according to claim 1, wherein a cross-sectional shape of the thread groove is a scalene triangle or an isosceles triangle.

* * * * *